Patented May 4, 1954

2,677,599

UNITED STATES PATENT OFFICE 2,677,599

MANUFACTURE OF HYDROXYLAMINE SULFONATES

Rudolph N. G. Zeegers, Beek, Netherlands, assignor to De Directie van de Staatsmijnen in Limburg, Heerlen, Netherlands Application February 16, 1951, Serial No. 211,255

Claims priority, application Netherlands February 22, 1950

8 Claims. (Cl. 23—114)

This invention relates to the manufacture of hydroxylamine sulfonates by the reaction of a nitrite and a bisulfite in aqueous solution with sulfur dioxide.

Field of invention

In the methods hitherto employed for manufacturing hydroxylamine sulfonates, using the above reaction, sodium salts have been commonly employed as the initial material and sodium hydroxide or sodium carbonate has been used instead of sodium bisulfite, since sodium bisulfite is formed from said compounds by the action of sulfur dioxide.

If at a temperature of about 0° C., a sulfur dioxide-containing gas is passed into an aqueous solution of sodium nitrite and sodium sulfite, the sodium salt of hydroxylamine disulfonic acid is formed, and by observing certain reaction conditions, a satisfactory yield can be obtained. The conditions under which this very exothermic reaction proceeds rapidly have been the subject of many investigations which have resulted in embodiments of the reaction more adapted to manufacturing conditions.

Progress has been made in this field by employing a film reactor of the type described in U. S. Patent No. 2,458,404. According to said patent, the sodium salt of hydroxylamine disulfonic acid is obtained by causing an aqueous solution of sodium nitrite and sodium bisulfite to flow down in the form of a thin film over the inner surface of a vertical cylindrical film reactor, countercurrently to a stream of sulfur dioxide passing up through said reactor. As a result of the brief contact period in the film reactor, side reactions are avoided so that even temperatures higher than 10° C. are admissible.

Experience has shown that in methods above referred to difficulties are experienced if ammonium compounds are employed instead of the nitrite and bisulfite of an alkali metal. In this case, vapors are formed which are entrained by the residual gas giving rise to high losses of ammonia which are not only disadvantageous from an economical viewpoint, but also because they interfere with maintaining the proper ratio between the reactants and undesirable variations are caused in the acidity of the reaction mixture. These difficulties become serious when gases with a low sulfur dioxide content, such as roasting gases, are employed, because then large amounts of gas have to be contacted with the reaction liquor and much residual gas is left to be carried off.

There is described in my application Serial No. 211,615, filed February 19, 1951, and now abandoned, a process for producing a reaction liquor suitable for the production of hydroxylamine sulfonates which includes the steps of reacting an aqueous solution of ammonium nitrite and ammonium bisulfite, or equivalent compound, with sulfur dioxide at a pH of between 5 and 7 thereby precipitating ammonium nitrilo-sulfonate from the reaction liquor, separating the precipitate from the liquor and collecting the latter for further reaction with sulfur dioxide for the purpose of forming hydroxylamine sulfonates. In the process of the above-mentioned application, sulfur dioxide is passed in countercurrent relationship with the ammonium compounds for the purpose of effecting the desired reaction.

Objects

A principal object of this invention is the provision of a new process for the manufacture of hydroxylamine sulfonates from ammonium nitrite and sulfur dioxide-containing gases. Further objects include:

(1) The provision of such a process in which gases, for example, roasting gases, containing only small percentages of sulfur dioxide, can be employed without giving rise to high losses of ammonia from the reaction liquors.

(2) The provision of new improvements in this general type of reaction which make possible the satisfactory control of proportions between essential reactants and maintenance of desired liquor acidities, so as to produce satisfactory product yields.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

General description

These objects are accomplished, according to the present invention, by carrying out the reaction of ammonium nitrite with ammonium bisulfite, or the chemical equivalent, to form hydroxylamine sulfonates by first providing an aqueous solution of ammonium nitrite and ammonium bisulfite, or equivalent material, dispersing this solution in a stream of sulfur dioxide-containing gas, such as by spraying the solution into a stream of the gas, flowing the dispersed solution concurrently with the stream of gas over a cool surface designed to create a large liquid surface area in contact with the gas stream and finally separating the resulting reaction liquor from the gas stream to recover a solution containing an hydroxylamine sulfonate.

The success of the present invention is due to a large extent to the discovery that, if the ammonium compound-containing solution is formed as a fine dispersion in the sulfur dioxide-containing gas stream and the resulting mass is then caused to flow together and concurrently in contact with a surface of large area and low temperature, the vapors produced from the ammonium compound containing solution do not give rise, as has been experienced previously, to losses of ammonia. At the same time, this new type of operation makes it possible to maintain a proper ratio between the various reactants and also to obtain a controlled degree of acidity, so that a satisfactory yield of product results.

Discussion of details—apparatus

Although successful results can be obtained with considerable variation in reaction conditions, most satisfactory results are obtained if the conditions are so selected that the reaction liquor, on leaving the cooled surfaces, has a pH value of about 3 to 4, and preferably 3.5. By regulating the feed of the initial materials, and particularly, the feed of the stream of gas, the said pH value may be maintained in a simple manner.

The process according to the invention is not confined to the employment of pure sulfur dioxide and gases with a high content of sulfur dioxide, but gases poor in sulfur dioxide are suitable for the purpose. In particular, the roasting gases obtained by the oxidation of sulfur-containing ores, which gases usually contain less than 10%, e. g. 2 to 8%, by volume of sulfur dioxide, may be employed without there being any danger that the vapors containing ammonium compounds formed during the reaction will be entrained by the residual gas.

Various proportions between the different reactants in the process can be employed, although better and more desirable yields of product are obtained if certain limitations on the proportions are observed. Preferably, the ammonium nitrite and the ammonium bisulfite or equivalent ammonium compounds which, upon reaction with sulfur dioxide in an aqueous medium, will form ammonium bisulfite, e. g. ammonium hydroxide, or ammonium sulfite should be present in the reaction mixture in about equal molecular proportions or with a slight excess of the ammonium bisulfite or equivalent materials.

In the process, the preferred reaction temperature is about 0° C. The reaction can also be carried out at higher temperatures, e. g., up to 20° C., but in this case, smaller yields are obtained, while temperatures down to the freezing point of the liquors can be used. The cooling is accomplished by contact of the reaction mixture with a cooled surface, e. g., between −10° and +10° C.

After the reaction liquor has left the cooled surfaces, an inert gas, preferably air, is passed through the liquor in order to free it from excess of sulfur dioxide still present therein, whereafter a final liquor is obtained which largely consists of a solution of hydroxylamine disulfonate. By means of hydrolysis, this can be converted into hydroxylamine monosulfonate and, if desired, into hydroxylamine sulfate.

The process according to the present invention can be more fully understood by reference to the accompanying diagrammatic drawings, in which.

Figure 1:
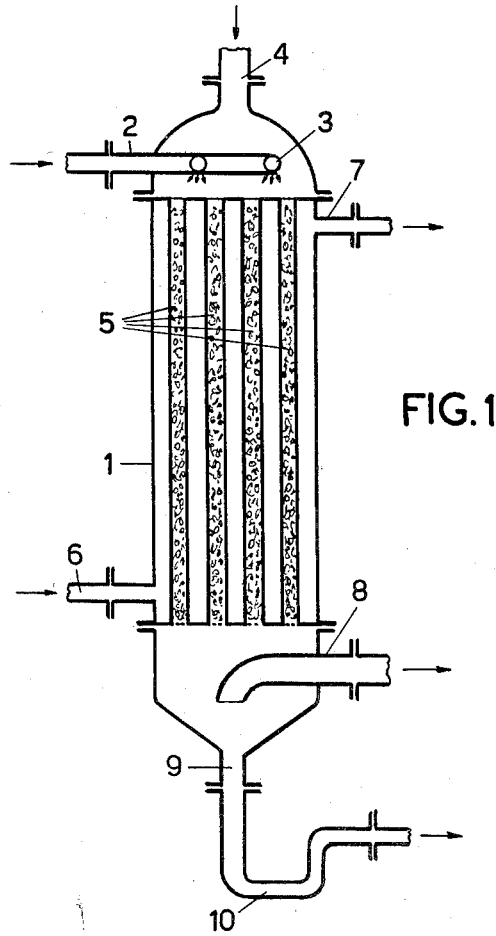
Figure 1 is a vertical section through one form of the apparatus which may be used to carry out the process of the invention.

Referring to Figure 1, a vertical reaction vessel 1 is provided with an inlet pipe 2 for an aqueous solution of ammonia and ammonium nitrite which, by means of a distributing ring 3, is distributed throughout a stream of sulfur dioxide-containing gas which is introduced through the gas inlet 4.

Subsequently, the reaction liquor is passed in conflow with the gas through a tubular system consisting of a number of vertical cooling pipes 5, said pipes being cooled by a cooling liquor which is introduced at 6 and flows round the pipes 5 towards the discharge pipe 7. The cooling pipes 5 are packed with filling material in order to promote the contact between the reaction liquor, flowing down through the pipes and the gas. The residual gas is carried off through the gas outlet 8, the hydroxylamine sulfonate solution leaving the reaction vessel through the pipe 9. The discharge pipe 9 is provided with a goose neck 10 so that the residual gas cannot pass through this outlet for the liquor.

Figure 2:
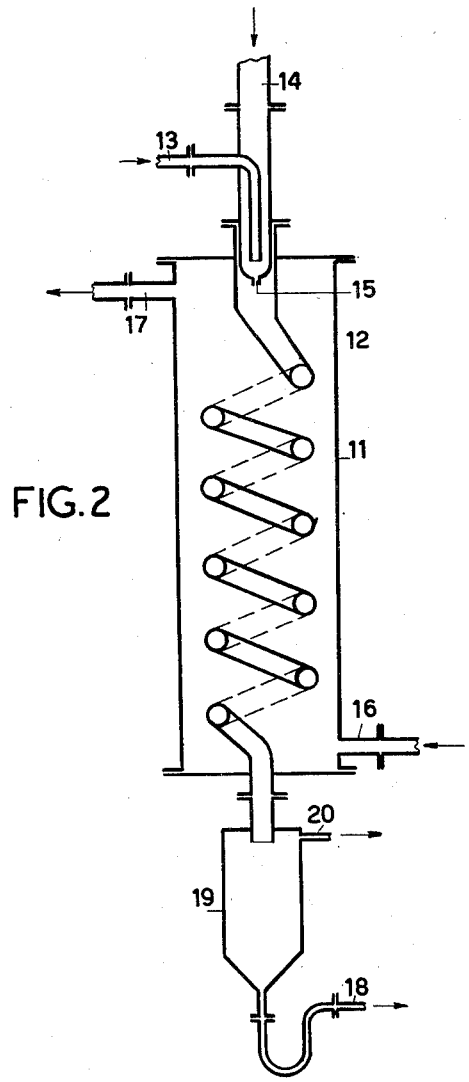
Figure 2 is a vertical section through another form of apparatus.

Referring to Figure 2, a helical reaction pipe 12 is contained in a cylindrical vessel 11. The solution of ammonium nitrite and ammonium hydroxide supplied through the pipe 13 is sprayed into the pipe 12 through the nozzle 15, together with a stream of roasting gas supplied through the pipe 14. Subsequently, the reaction liquor flows, in conflow with the roasting gas, over the walls of the pipe 12, said walls being cooled by a cooling liquor which enters the vessel 11 through the inlet 16 and leaves through the outlet 17. In an analogous manner, as has been illustrated in Figure 1, the resulting solution of hydroxylamine sulfonate is carried off through the pipe 18, whereas the residual gas leaves the separating vessel 19 through the gas outlet 20.

Figure 3:
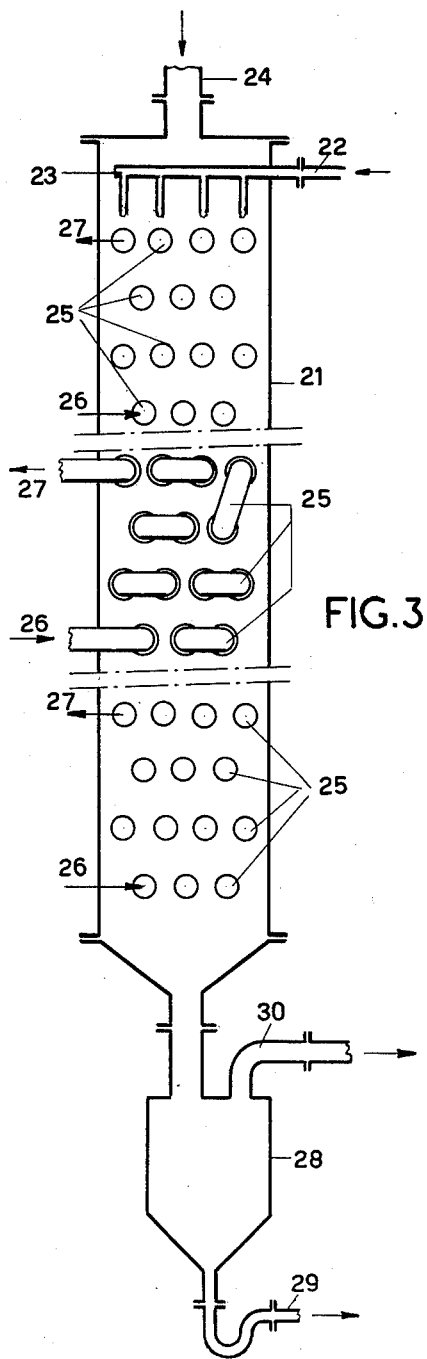
Figure 3 is a further form of apparatus with systems of cooling pipes shown in broken vertical section at the top and bottom of the figure and in exterior elevation in the middle broken portion of the figure.

Referring to Figure 3, an aqueous solution of the initial ammonium compounds is continuously introduced into a cylindrical reaction vessel 21 through the pipe 22 and the distributor 23, a sulfur dioxide-containing gas being supplied through the gas inlet 24. Subsequently, the reaction liquor flows in conflow with the gas over the outer walls of the cooling pipes 25, which have been combined into systems through which a cooling medium is passed, said medium being supplied through the inlet pipes 26 and discharged through the pipes 27 in each system. The hydroxylamine sulfonate solution obtained is separated from the gas in the separator 28 and carried off through the pipe 29, in an analogous manner, as has been illustrated in Figure 1, whereas the gas leaves the apparatus through the gas outlet 30.

Example

In order to provide for a fuller understanding of the procedures as provided by this invention, there is given below an example of actual operation in accordance with the invention for the production of an hydroxylamine sulfonate.

In an apparatus, as illustrated in Figure 1, an aqueous solution, containing 150 g. of ammonium nitrite and 84 g. of ammonium hydroxide per litre, is continuously run into the reaction vessel 1 through the inlet pipe 2 and sprayed therein with the help of the distributing ring 3. Roasting gas, containing about 6% by volume of sulfur dioxide, is continuously supplied through the gas inlet 4. The rate of delivery of the roasting gas is so adjusted at about 2000 liters per liter of the aqueous solution, that the reaction liquor, on leaving the system of tubes 5, has a pH value of about 3.5.

With the help of air, the reaction liquor leaving the reaction vessel is freed from the sulfur dioxide still present therein. A final liquor is obtained which contains hydroxylamine disulphonate with a concentration of 69 to 72 g. per liter (calculated as $NH_2OH$) which corresponds with a yield of over 90% based on the ammonium nitrite.

Conclusions

New improvements in the generally known reaction for the formation of hydroxylamine sulfonates by reaction of nitries and bisulfites with sulfur dioxide have been discussed. Through the use of these new improvements, it is possible to produce the hydroxylamines in high yield and with such economy of reaction materials that it is possible to employ ammonium nitrite and ammonium bisulfite or similar substances in the reaction on a commercial basis. At the same time, specific embodiments of usable apparatus have been described by which the improvements can be carried out in a commercially feasible method without requiring the use of highly skilled technicians.

I claim:

1. A process for the manufacture of hydroxylamine sulfonates which comprises providing an aqueous solution of ammonium nitrite and a substance from the group consisting of ammonium bisulfite and ammonium compounds which react in aqueous solution with sulfur dioxide to form ammonium bisulfite, dispersing said solution in a stream of sulfur dioxide-containing gas, flowing said dispersed solution concurrently with said stream of gas over a cooled surface providing a large liquid surface area whereupon reaction liquir flowing concurrently and in contact with said gas stream is obtained, and then separating the resulting reaction liquor from the gas stream.

2. A process as claimed in claim 1, wherein such a proportion of solution to gas is maintained that said reaction liquor has a pH of about 3 to 4.

3. A process as claimed in claim 1, wherein said ammonium compound is ammonium hydroxide.

4. A process as claimed in claim 1, wherein said ammonium compound is ammonium sulfite.

5. A process as claimed in claim 1, wherein said gas is roasting gas.

6. A process as claimed in claim 1, wherein said dispersing of the solution is accomplished by spraying the solution into said gas stream.

7. A process as claimed in claim 1, wherein said cooled surface has a temperature between about $-10°$ and $+10°$ C.

8. A process for the manufacture of hydroxylamine sulfonates which comprises providing an aqueous solution of ammonium nitrite and ammonium hydroxide, spraying said solution into a stream of sulfur dioxide-containing gas, flowing said sprayed solution concurrently with said gas stream over a surface which provides a large liquor surface area and is sufficiently cold to cool said solution to about 0° C. whereupon reaction liquor flowing concurrently and in contact with said gas stream is obtained and then separating the resulting hydroxylamine sulfonate-containing liquor from the remaining gas stream.

References Cited in the file of this patent

UNITED STATES PATENTS

| Number | Name | Date |
|---|---|---|
| 1,010,177 | Raschig | Nov. 28, 1911 |
| 2,458,404 | Nagle | Jan. 4, 1949 |
| 2,555,667 | Zeegers | June 5, 1951 |

OTHER REFERENCES

J. W. Mellor's "Modern Inorganic Chem.," January 1935, new impression of eighth ed., page 657. Longmans, Green and Co., N. Y.